Patented May 10, 1932

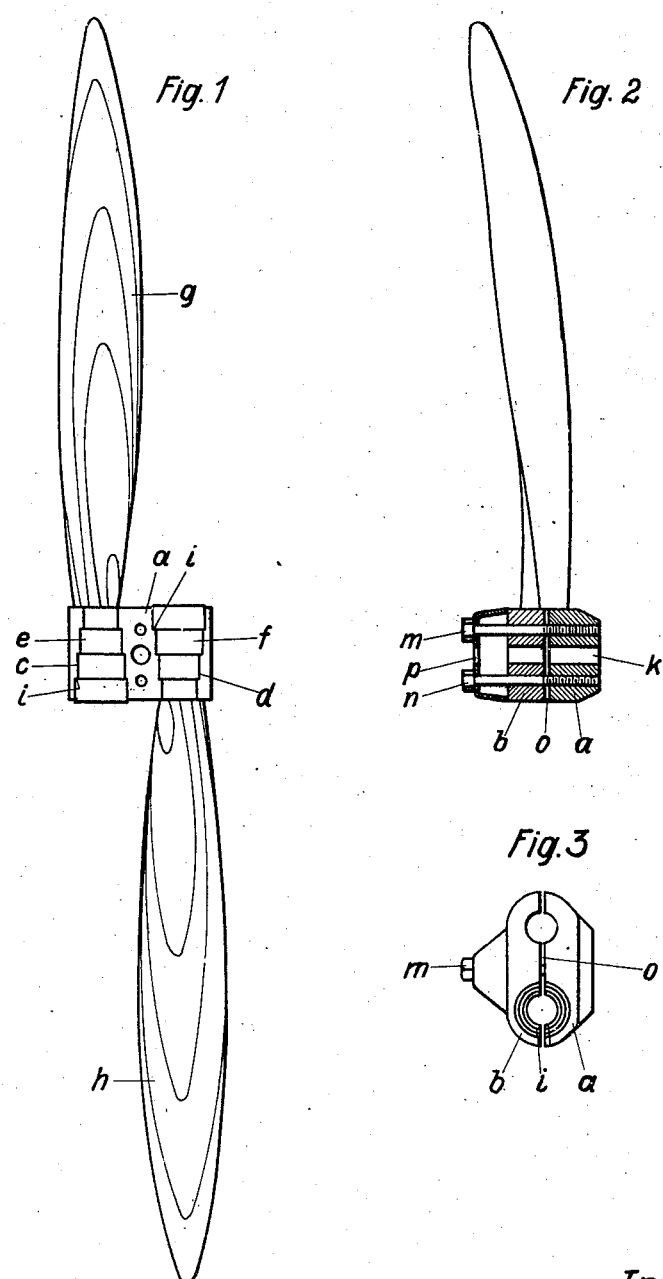

1,857,678

UNITED STATES PATENT OFFICE

HEINRICH SUKOHL, OF BERLIN-WAIDMANNSLUST, GERMANY

SCREW PROPELLER FOR USE UPON AIRCRAFT

Application filed April 17, 1930, Serial No. 444,936, and in Germany April 22, 1929.

My invention relates to improvements in screw propellers for use upon air-craft, and more particularly in screw propellers in which the propeller blades made from wood are clamped within the hub, the said hub being made in two sections clamped together and on the inner ends of the blades by means of screw bolts or the like. As now constructed the propeller blades terminate at their inner ends in conical journals or shafts engaging in corresponding bores of the hub. In the operation of the propeller the said conical journals or shafts act as wedges within the sectional hub tending to force the sections apart, and by reason of the high centrifugal force of the blades the strain exerted on the hub and the members connecting the sections thereof is high, so that strong and heavy hubs and connecting members are needed. The object of the improvements is to provide a propeller of the class indicated in which the said strain is reduced, and with this object in view I compose the tapering shafts or journals of the blades from a plurality of stepped cylindrical portions providing annular shoulders disposed transversely of the length of the blades, the hub being formed with corresponding recesses. Thus the wedging action caused by centrifugal force is obviated, and the said centrifugal force is taken up by the transverse annular shoulders of the shafts or journals and the corresponding shoulders formed in the tapering recesses of the hub. By thus constructing the shafts or journals and the hubs also the compression of the said shafts or journals caused by the wedging action is obviated, so that the blades are rigidly held within the hub for any length of time.

For the purpose of explaining the invention an example embodying the same has been shown in the accompanying drawings, in which the same letters of reference have been used in all the views to indicate corresponding parts. In said drawings, Fig. 1 is an elevation showing the propeller, one of the sections of the hub being removed for more clearly showing the shape of the shafts or journals of the blades, Fig. 2 is a sectional elevation taken on the line 2—2 of Fig. 1, and Fig. 3 is an elevation showing the hub.

In the construction shown in the figures the hub of the propeller is divided transversely of the propeller shaft into two sections $a$ and $b$ slightly spaced from each other, as is shown at $o$, and adapted to be clamped towards each other by screw bolts $m$ and $n$, a cap $p$ being placed on the section $b$ and fixed in position by means of the said bolts. The hub sections are provided with aligned bores $k$ by means of which they are fixed to the propeller shaft. At opposite sides of the said bore the hub is formed with tapering recesses adapted to receive the journals or shafts $e$ and $f$ of the blades $g$ and $h$. As shown the said journals or shafts $e$ and $f$ taper inwardly from their outer ends towards the body of the blades, and they are composed of a plurality of cylindrical portions $c$ and $d$ which are successively reduced in diameter thus providing transverse annular shoulders $i$, and the bores of the hub are shaped accordingly. The blades and their journals are made from wood.

For assembling the propeller the shafts or journals $e$ and $f$ are placed into the recesses of one of the sections of the hub, the other section and the cap $p$ are placed thereon, and the hub sections are firmly pressed together by means of the screw bolts $m$ and $n$. Should it be desired to vary the position of the blades relatively to the hub the screws $m$ and $n$ are slightly unscrewed and the blades are turned into the desired annular position, whereupon the screw bolts $m$ and $n$ are again screwed inwardly for clamping the parts together.

In the operation of the propeller the centrifugal action forces the annular shoulders $i$ of the journals or shafts $e$ and $f$ on the corresponding annular shoulders formed in the hub, the cylindrical portions $c$ and $d$ permitting slight displacement of the journals axially of the blades, until the shoulders $i$ are in engagement with the corresponding shoulders of the hub.

In the construction of the propeller it is difficult to manufacture the recesses of the hub and the stepped portions of the journals of the blades exactly alike, and it may happen that only some or only one of the cylindrical portions c and d of the journals are in engagement with the walls of the recesses of the hub, so that the number of the supporting surfaces of the hub is reduced and the surface pressure of the said portions is too high. To insure exact fitting of the whole surfaces of the journals I turn the propeller blades within their hubs while gradually screwing the bolts m and n inwardly. Thus the sharp edges of the cylindrical sections of the recesses of the hub have a fraising action reducing the journals in diameter until all the surfaces of the journals bear on the corresponding surfaces of the hub. By thus manufacturing the propeller the journals may originally be made cylindrical, the stepped sectional cylindrical surfaces c and d being fraised into the same by the edges of the sectional hubs, or the journals may be made with stepped cylindrical surfaces which are larger in diameter than the recesses of the hub, and which are brought into final shape by turning the same within the recesses, the edges of the recesses acting as fraising tools. Thereby an exact fitting of the parts and a uniform distribution of the forces are insured.

I claim:

1. A propeller for air-craft, comprising a wooden blade formed at its inner end with a journal tapering from its end towards the body of the blade and composed of a plurality of stepped cylindrical portions bounded at their adjacent ends by transverse annular shoulders perpendicular to the axis of said journal, and a hub formed with a bore corresponding in shape to the shape of the journal and having said journal mounted therein.

2. A propeller for air-craft, comprising a wooden blade formed at its inner end with a journal tapering from its end towards the body of the blade and composed of a plurality of stepped cylindrical portions bounded at their adjacent ends by transverse annular shoulders perpendicular to the axis of said journal, a hub formed with a bore corresponding in shape to the shape of the journal and having said journal mounted therein, said hub being divided axially of the bore into sections, and means for clamping said sections and the journal embedded therein together.

3. A propeller for air-craft, comprising a wooden blade formed at its inner end with a journal tapering from its end towards the body of the blade and composed of a plurality of stepped cylindrical portions bounded at their adjacent ends by transverse annular shoulders perpendicular to the axis of said journal, a hub formed with a bore corresponding in shape to the shape of the journal and having said journal mounted therein, said hub being divided axially of the bore into sections and the sections of the bore thus produced being formed with sharp edges.

4. A propeller blade comprising a body and a journal of wood tapering from its end towards said body and composed of stepped cylindrical portions bounded at their adjacent ends by transverse annular shoulders perpendicular to the axis of said journal.

5. A hub comprising a body and a tapering bore composed of stepped cylindrical portions bounded at their adjacent ends by transverse annular shoulders perpendicular to the axis of said bore.

In testimony whereof I hereunto affix my signature.

HEINRICH SUKOHL.